May 20, 1952 — H. R. TEAR — 2,597,137
CONTROL APPARATUS FOR CENTRALIZED LUBRICATING SYSTEMS
Filed Aug. 15, 1946
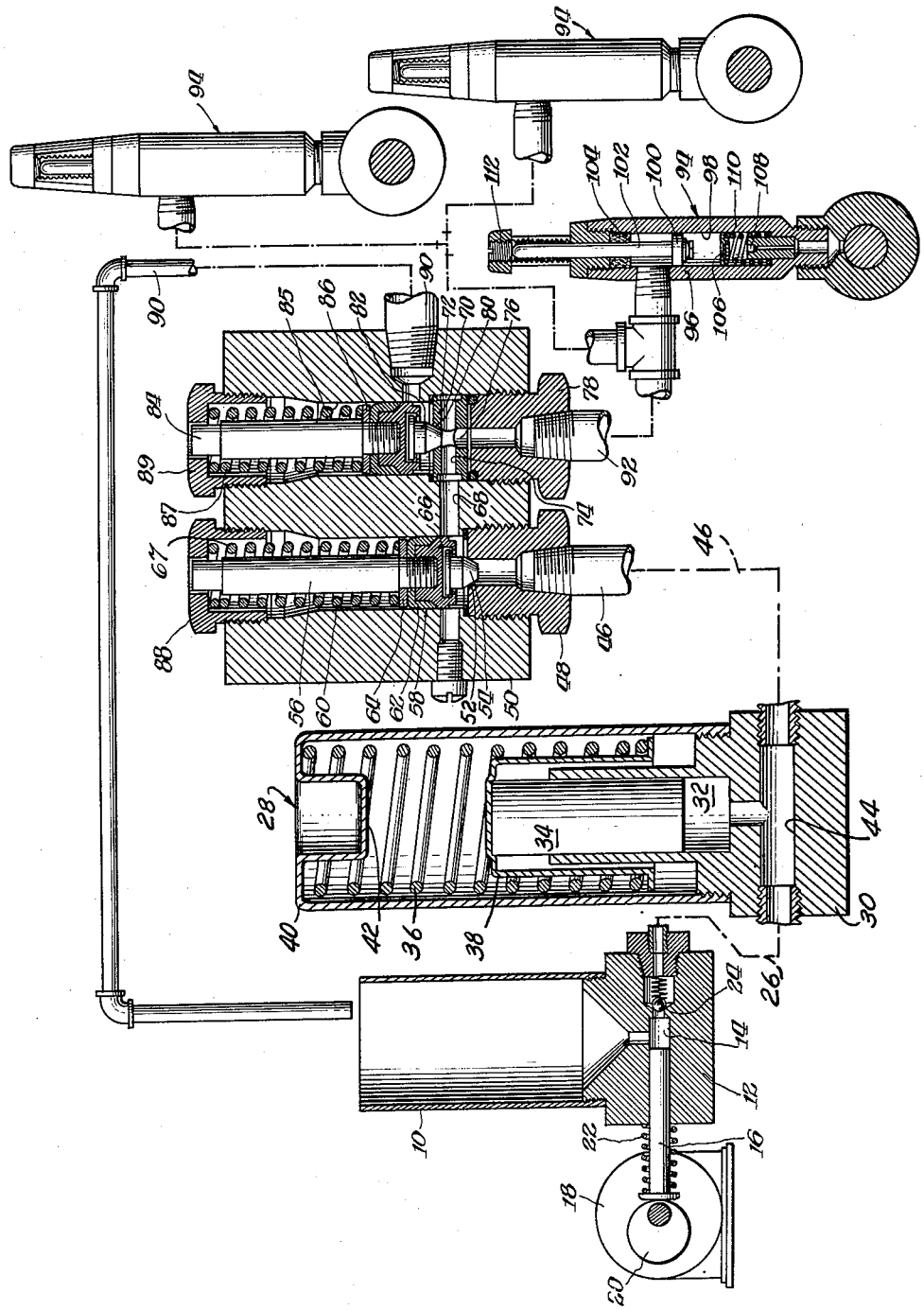
Inventor:
Harry R. Tear
By: Hinkle, Horton, Ahlberg, Hanamann & Kupper
Attorneys.

Patented May 20, 1952

2,597,137

UNITED STATES PATENT OFFICE 2,597,137

CONTROL APPARATUS FOR CENTRALIZED LUBRICATING SYSTEMS

Harry R. Tear, Evanston, Ill., assignor to Stewart-Warner Corporation, Chicago, Ill., a corporation of Virginia Application August 15, 1946, Serial No. 690,657

5 Claims. (Cl. 184—7)

1

My invention relates generally to centralized lubricating systems, and more particularly to improved means for supplying lubricant under pressure to lubricant measuring or feeder valves at predetermined intervals, and thereafter relieving the pressure so as to cause resetting of the measuring valves.

In centralized lubricating systems employing measuring valves or feeder devices of the type shown in the patent to Teal No. 2,205,320, and in the copending application of Frederick G. Schweisthal Serial No. 570,961, filed January 1, 1945, now Patent Number 2,516,427, it is necessary to supply a predetermined quantity of lubricant under relatively high pressure to cause operation of the measuring valves and thereafter to relieve the pressure to permit resetting of the measuring valves.

In the past, it has been common practice either to supply the lubricant to the system by a manually operated pump, or to provide a timing control mechanism whereby the pump was intermittently operated. Such systems necessarily became rather complicated, usually involving the use of a synchronous motor driven timing mechanism, a motor control relay, or a solenoid operated valve, and similar controls. In view of the fact that the pump had to supply the total amount of lubricant required for the operation of all of the measuring valves in a comparatively short time, the pump had to be of a relatively large capacity, and the pump driving motor had to be correspondingly high powered.

In the control apparatus of my invention, these complications and difficulties are avoided, and the pump is arranged to operate continuously and thus may be of lower capacity than would otherwise be required.

It is therefore the primary object of my invention to provide an improved automatic control apparatus for centralized lubricating systems, which is operative to supply a predetermined quantity of lubricant to the lubricant measuring valves at predetermined intervals, and to relieve or greatly reduce the lubricant pressure in the system during the intervals between pressure application.

A further object is to provide an improved control apparatus for centralized lubricating systems, which is simple in construction, does not require an excessively high capacity pump, which is reliable in operation, and which may be economically manufactured.

Other objects will be apparent from the following description, reference being had to the

2 accompanying drawing which is in part a schematic and in part a sectional view of a lubricating system employing my improved control apparatus, various parts of the system being shown to different scales.

Referring to the drawing, the lubricant is supplied to the system from a reservoir 10 by a pump comprising a body 12 having a cylinder 14 therein. A plunger 16 is driven by a motor 18 through an eccentric cam 20 which bears against the end of the plunger, the plunger being held against the cam by a compressed coil spring 22. A spring pressed ball check valve 24 is located at the outlet of the cylinder 14 and lubricant flowing past this check valve passes through a conduit 26 into an accumulator 28, the latter comprising a body 30 having a cylinder 32 formed therein. A plunger 34 is fitted in the cylinder 32 and is pressed downwardly by a relatively strong coil spring 36 which is compressed between an inverted cup-shaped saddle 38 resting on or secured to the plunger 34, and a cylindrical casing 40 which is threaded to the body 30. The casing 40 is provided with an indentation 42 forming a limit stop for upward movement of the plunger 34. Lubricant supplied by the pump is free to flow either through the body 30 or into the cylinder 32 via an inverted T-shaped passageway 44, the passageway 44 being connected by a pipe 46 with a bushing 48 threaded in a valve block 50.

The inner end of the bushing forms a seat 52 for a valve 54 which is carried by a piston rod 56 having a suitable piston 58 reciprocable in a cylinder 60. The piston 58 includes a cup washer 62, a backing plate 64, and a nut 66 which is threaded at the lower end of the piston rod 56 and clamps the other elements of the piston structure to the piston rod. The nut 66 is also formed to hold the valve 54, the connection being such that the valve 54 has a limited degree of freedom so as to be capable of adjusting itself to the valve seat 52. The valve 54 is held in closed position by a compressed coil spring 67.

A suitable passageway 68 connects the lower end of the cylinder 60 with a valve seat member 70, which has an annular groove 72, a diametral bore 74, and an axial bore 76. The member 70 is clamped in position by a bushing 78 threaded in the block 50, suitable gaskets being provided to prevent leakage of lubricant past the valve seat member 70. A seat 80 is formed in the valve seat member 70 at the upper end of the bore 76 for cooperation with a valve 82 carried by a piston rod 84 having a piston structure 86 similar to the piston structure 58, the piston being reciprocable in a bore. The valve 82 is, however, of smaller diameter than the valve 54, and is held against its seat by a compressed coil spring 87.

The upper ends of the piston stems 56 and 84 are of reduced diameter and are guided in bushings 88 and 89, respectively, which are threaded in the block 50, to form indicators to show whether the valves 54 and 82, respectively, are open or closed.

Lubricant flowing past the valve 82 is free to flow through a conduit 90 back to the reservoir 10. The bushing 78 is connected by a branched conduit system 92 with a group of measuring valves 94. These measuring valves may be of the construction disclosed in the aforesaid Teal patent, or the improvement thereof shown in the aforesaid Schweisthal application. Briefly, each of these valves comprises a body 96 with a cylindrical bore 98 in which a piston 100 is reciprocable, the piston having a rod 102 extending from the body through a suitable packing 104. A valve 106 is pressed away from an outlet port 108 by a spring 110. The piston is provided with a suitable bypass through it, or along its side, so that lubricant may flow slowly past the piston.

Thus, with the parts in the positions shown, upon the application of lubricant under pressure through the conduit system 92 which is connected to the upper end of the cylindrical bore 98, the piston moves downwardly, forcing the grease beneath it into the bearing until the piston engages the valve 106 and presses it against the means forming the outlet port 108 to stop the flow of lubricant to the bearing. As long as the pressure in the conduit system is maintained sufficiently high, the valve 106 will remain pressed against its seat and thereafter the lubricant under pressure will flow past the restricted bypass in the piston 100 and force the latter upwardly due to the greater effective area of the lower surface of the piston, until the piston rod engages an adjustable limit stop 112. When the pressure in the conduit system 92 is reduced sufficiently, for example, to 100 p. s. i. the spring 110 will force the valve 106 from its seat, thereby conditioning the measuring device for a repetition of the above described operating cycle.

From the foregoing description of the operation of the measuring valve or device, it will be seen that it requires that the pressure in the conduit system 92 be maintained at a relatively high value for a sufficient interval of time to cause the piston 100 to travel to the lower end of its stroke and return, and that thereafter the pressure in the conduit system must be relieved to about 100 p. s. i. so as to permit the opening of the valves 106 in the various measuring devices. Furthermore, in order to prevent undesired bypassing of lubricant past the pistons 100 of the various measuring devices, the application of pressure to the conduit system 92 must be rapid and this high pressure must be sustained until each of the measuring devices 94 has operated through a complete cycle.

The first requirement, that the pressure be suddenly applied to the conduit system 92, is fulfilled by virtue of the fact that the lubricant pressure in the pipe 46 must exceed a predetermined value, such as 800 p. s. i. before valve 54 will open. When it has opened, however, it will be maintained in open position as long as the pressure in the pipe 46 exceeds a much lower value, such as 175 p. s. i. The second requirement, that the application of pressure to the conduit system 92 shall be sustained at this high value, is fulfilled by the accumulator 28.

It will be understood that the various parts of the system are not to the same scale in the drawing, and that the accumulator should have a capacity almost sufficient to supply a charge of lubricant to each of the measuring devices 94 connected to the conduit system 92. Since the pump operates continuously during the discharge of the accumulator, it is not essential that the capacity of the accumulator be exactly equal to or greater than the aggregate of the capacities of the measuring valves. However, if a margin of safety is desired, to make allowance for possible slight leakages of the system, etc., the capacity of the accumulator may be made slightly greater than the aggregate of the capacities of the measuring valves.

The spring 36 of the accumulator is sufficiently strong and of sufficient length that the plunger 34 will be substantially at its uppermost limit of movement while the pressure of the lubricant in the cylinder 32 attains a value of 800 p. s. i., and that when the plunger 34 is near the lower end of a stroke, the spring 36 still exerts a force sufficient to balance a lubricant pressure of 600 or 700 p. s. i.

The sizes of the valve 82 and of the cylinder 85 and the characteristics of the spring 87, are such that this valve will open at a very high pressure, such as 1500 p. s. i., and will not close until the pressure in the lower end of the cylinder 85 drops to a relatively low value, such as 100 p. s. i.

In normal use of the control apparatus, the pump operates continuously to supply lubricant under the requisite pressure to the accumulator 28. When the accumulator is substantially filled with lubricant, the pressure therein will rise to 800 p. s. i., thereby forcing the valve 54 from its seat 52, permitting the accumulator to discharge its contents past the valve 54 and through passageways 68 and 74, bore 76, and bushing 78, to the conduit system 92, and hence to the various measuring devices 94, causing the operation of all of these devices in the manner heretofore described. When all of the measuring devices 94 have been operated, the pump, being in continuous operation, will build up the pressure in the conduit system until it attains a value of 1500 p. s. i., whereupon the valve 82 will be forced from its seat 80. The pressure in the conduit system will thus drop rapidly, due to the venting of the lubricant past the valve 82, which, it will be recalled, will remain open as long as the pressure in the conduit system exceeds a low value, such as 100 p. s. i. As soon as the pressure drops below 175 p. s. i., the valve 54 will reclose and the lubricant supplied by the pump will again flow into the accumulator 28 to recharge the latter. In the meantime the pressure in the conduit system 92 continues to drop until, when it reaches approximately 100 p. s. i., venting valve 82 again closes, and the entire system is restored to its original condition, completing the cycle of operation.

It will thus appear that the frequency of operation and the timing of the entire cycle of operation are controlled by the following factors: (a) the rate of discharge of the pump; (b) the capacity of the accumulator 28; (c) the pressure at which the valve 54 opens, and (d) the pressure at which the valve 82 opens. These various factors may be changed at will to secure any timing cycle desired or required for any particular installation. The various values of pressures, etc., at which the valves open and close are thus merely illustrative and may be varied to suit the requirements of a particular installation.

Due to the use of the pressure accumulator 28, the pump may be of much smaller capacity and its driving motor 20 of much less power than would be necessary if the pump were to be operated intermittently and were required to maintain the pressure necessary for the operation of the measuring devices 94 throughout their operating cycles.

Thus, all the functions of relatively complicated time clock controlled switches, relays, solenoid operated valves, etc., is avoided, and the timing of the operation is nevertheless controlled with a fairly high degree of accuracy by a simple, rugged, and durable mechanical and hydraulic structure.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an apparatus for controlling the supply of lubricant under pressure to a conduit system connecting a plurality of lubricant charge measuring devices of a centralized lubricating system, the combination of a lubricant reservoir, an accumulator for storing a predetermined volume of lubricant under pressure, a pump having its inlet connected to the reservoir and its outlet connected to the accumulator, means providing a passageway connecting the accumulator to the conduit system, a first valve in said passageway exposed to the pressure of the lubricant in the accumulator, a spring holding the first valve closed until the pressure in the accumulator exceeds a predetermined value, a cylinder connected to the accumulator when the first valve is open, a piston in the cylinder and connected to the first valve to hold it open when the pressure is substantially less than that required to open the first valve, a second lubricant pressure operated spring pressed valve exposed to the pressure of the lubricant in the conduit system and opened thereby only when the pressure in the conduit system greatly exceeds that required to open the first valve, means connected to the second valve to hold it open at a lower pressure than is required to hold the first valve open, and means for conveying lubricant flowing past the second valve to the lubricant reservoir.

2. In an apparatus for intermittently supplying lubricant under pressure to a plurality of measuring devices connected to a common conduit system, the combination of a pump, an accumulator connected to receive the lubricant discharged by the pump and to store it under pressure, a first spring loaded poppet valve connected to receive lubricant from the accumulator, the spring of the valve being of such strength that it will hold the valve closed until a high lubricant pressure is attained and will close only after the pressure has been substantially reduced, said valve controlling the flow from the accumulator to the conduit system, means forming a vent passageway for discharging lubricant from the conduit system, and a second spring loaded valve controlling the flow of lubricant through the vent passageway, the spring of said second valve being sufficiently strong to hold the valve in closed position until the pressure in the conduit system exceeds substantially that required to open the first valve, and to hold the valve in open position by lubricant pressure substantially lower than that required to hold the first valve open.

3. In a lubricant supply system for a centralized lubricating system employing measuring valves which for their operation require alternate application and relief of pressure on the lubricant in the conduit system through which the lubricant flows to the measuring valves, the combination of a relatively small capacity continuously operating pump; an accumulator having a capacity substantially equal to the aggregate capacities of the measuring valves and connected to the pump to receive the lubricant discharged therefrom; a pair of spring loaded valve devices each including a valve, a valve seat, and a cylinder and valve operating piston of substantially greater cross sectional area than that of the valve seat, whereby the valves will be held open by lubricant pressures much lower than the pressures required to open them; means connecting one of said valves to the accumulator and to the conduit system, said valve preventing flow of lubricant from the accumulator to the conduit system until the pressure of the lubricant in the accumulator exceeds that necessary for the operation of the measuring valves and being maintained in open position by the lubricant pressure on its piston when the pressure of the lubricant in the accumulator drops substantially below that required for the operation of the measuring valves; means connecting the other of said valves to the conduit system to be operated by lubricant pressure therein; and means providing a lubricant vent port for the discharge of lubricant from the second valve, said second valve being held in closed position until the pressure in the conduit system rises substantially above that required for the operation of the measuring valves and being held in open position by the lubricant pressure in the conduit system until the pressure therein is relieved sufficiently to permit resetting of the measuring valves.

4. A lubricant supply system for centralized lubricating systems comprising a continuously operated pump; an accumulator connected to the pump to receive the lubricant discharged therefrom and to store the lubricant under pressure; a first spring loaded check valve connected between the accumulator and the conduit system and normally preventing flow of lubricant from the former to the latter; a piston connected to the valve; a cylinder for the piston connected to the conduit system; said piston and cylinder having a substantially greater cross sectional area than that of the valve; means providing a vent for the discharge of lubricant from the conduit system; a second spring loaded check valve connected between the conduit system and the vent and normally closed to prevent escape of lubricant from the conduit system; a piston connected to the second valve; a cylinder for the piston of the second valve connected to the vent means; said last named piston and cylinder having a cross sectional area substantially greater than that of the second valve; the relative cross sectional areas of the valves and their associated pistons and the spring loading of the valves being such that as the pressure in the accumulator increases the first valve will open first to permit lubricant under pressure to flow from the accumulator to the conduit system, and as the pressure in the conduit system increases beyond that required for the operation of the measuring valves the second valve will open, and as the pressure decreases to a relatively low value the first valve will close and as the pressure decreases further, the second valve will close.

5. In an apparatus operating at successively increasing graduations of pressures P1, P2, P3, and P4, for intermittently supplying lubricant under pressure to a plurality of measuring devices connected to a common conduit system, the combination of a small capacity continuously operating pump, a large capacity pressure accumulator connected to receive the lubricant discharged by the pump, a first poppet valve, means connecting the first poppet valve to the pressure accumulator, means connecting the first poppet valve to the conduit system, a spring loading said first valve so that it will not open until a pressure P3 is attained in the pressure accumulator and will close the valve only after the pressure has been reduced to P2, whereby said valve controls the flow of lubricant from the accumulator to the conduit system, a vent conduit for discharging lubricant from the conduit system, a second poppet valve having an inlet and outlet, means connecting the inlet of the second valve to the conduit system and connecting its outlet to the vent conduit, and a spring loading said second poppet valve to hold it in closed position until the pressure in the conduit system attains P4 and to hold the valve in open position until the pressure drops below P1.

HARRY R. TEAR.

REFERENCES CITED

The following references are of record in the file of this patent:

UNITED STATES PATENTS

| Number | Name | Date |
| --- | --- | --- |
| 1,903,554 | Pritchard | Apr. 11, 1933 |
| 1,934,053 | Gleason | Nov. 7, 1933 |
| 1,959,060 | Norelius | May 15, 1934 |